US005800663A

United States Patent [19]

Imahori et al.

[11] Patent Number: 5,800,663

[45] Date of Patent: Sep. 1, 1998

[54] TERMINAL CONNECTION METHOD OF A COIL AND TERMINAL CONNECTION STRUCTURE OF A COIL

[75] Inventors: Yoshio Imahori; Kazushi Suzuki; Kazushige Tajima, all of Shizuoka, Japan

[73] Assignee: Star Micronics Co., Ltd., Shizuoka, Japan

[21] Appl. No.: 708,695

[22] Filed: Sep. 5, 1996

[30] Foreign Application Priority Data

Sep. 7, 1995 [JP] Japan .................................... 7-255473

[51] Int. Cl.[6] .................................................... B29C 65/54

[52] U.S. Cl. .......................... 156/304.1; 29/877; 336/192

[58] Field of Search ................................ 156/51, 49, 158, 156/304.1; 29/877; 336/192

[56] References Cited

U.S. PATENT DOCUMENTS

| | | | |
|---|---|---|---|
| 4,731,282 | 3/1988 | Tsukagoshi et al. | 428/220 |
| 5,019,944 | 5/1991 | Ishii et al. | 361/400 |

*Primary Examiner*—Francis J. Lorin

*Attorney, Agent, or Firm*—Sughrue, Mion, Zinn, Macpeak & Seas, PLLC

[57] ABSTRACT

A terminal connection method of a coil comprises the steps of arranging coil terminals of a coil on lead terminals; removing insulating coats of the coil terminals to expose core wires; and applying an electric conductivity adhesive to connected portions of the coil terminals and the lead terminals. A terminal connection structure of a coil comprises coil terminals arranged on lead terminals, with insulating coats removed from the coil terminals; and an electric conductivity adhesive applied to connected portions of the coil terminals and the lead terminals.

6 Claims, 10 Drawing Sheets

TERMINAL CONNECTION METHOD OF A COIL AND TERMINAL CONNECTION STRUCTURE OF A COIL

BACKGROUND OF THE INVENTION

1. Field of the Invention

The present invention relates to a terminal connection method of a coil and a terminal connection structure of a coil for use in an electromagnetic type electroacoustic transducer, and, more particularly, to a terminal connection method of a coil and a terminal connection structure of a coil, which connect coil terminals of a coil and lead terminals using an electric conductivity adhesive.

2. Description of the Related Art

A conventional electromagnetic type electroacoustic transducer is structured as illustrated in, for example, FIGS. 12 and 13. A case 201 is closed on the left-hand side in FIG. 13 and has an opening 203 on the right-hand side in the diagram. A base member 205 is attached to the opening 203 to close the opening 203. A base 207 is attached to the base member 205 with a core 209 attached to the center of the base 207.

A coil (magnet wire) 211 is attached on the outer surface of the core 209, and a magnet 215 is provided around the coil 211 with a clearance 213 therebetween. A support ring 217 is provided around the magnet 215. This support ring 217 has a step portion on the left-hand side in FIG. 13 at which a diaphragm 218 is provided. This diaphragm 218 comprises an elastic plate (also called a resonance plate) 219 and a magnetic piece 221 attached as an added mass to the center portion of this elastic plate 221.

As shown in FIG. 12, the base member 205 is provided with a pair of lead terminals 223 and 225 which have lands 223*a* and 225*a*. The aforementioned coil 211 has coil terminals 211*a* and 211*b* respectively extending over the lands 223*a* and 225*a*. The coil terminals 211*a* and 211*b* are securely soldered to the respective lands 223*a* and 225*a* of the pair of lead terminals 223 and 225.

In the thus constituted electromagnetic type electroacoustic transducer, the elastic plate 219, integrally provided with the magnetic piece 221, is attracted by the magnet 215 so that it has a given polarity. When a current flows across the coil 211 via the lead terminals 223 and 225 under this situation, the core 209 is magnetized, generating a magnetic field at the distal end. When the magnetic pole of the core 209 induced by the coil 211 differs from the magnetic pole induced by the magnet 215 attached to the elastic plate 219, the elastic plate 219 is attracted to the core 209. When the former magnetic pole of the core 209 is the same as the latter magnetic pole induced by the magnet 215, the elastic plate 219 repels the core 209. By allowing the current to intermittently flow in either direction, therefore, the elastic plate 219 repeats the above-described operation. In other words, the elastic plate 219 vibrates at a given frequency, thus generating a sound.

FIG. 14 illustrates another type of an electromagnetic type electroacoustic transducer. A case 301 has a sound port 303 formed in the center of the upper end in FIG. 14. The case 301 has an opening 307 in the lower end in FIG. 14. A base 309 is attached to the opening 307, and a core 311 is secured to the center of the base 309. A bobbin 313 having an approximately drum shape is attached to the outer surface of the core 311, with a coil (magnet wire) 315 wound around the bobbin 313. Coil terminals 315*a* and 315*b* at both ends of the coil 315 are bound to rod-shaped lead terminals 317 and 319 which are securely press-fitted in the bobbin 313.

A plastic magnet 321 is arranged on the outer surface side of the coil 315, and has a step portion of on the upper side in FIG. 14 at which a diaphragm 322 is provided. This diaphragm 322 comprises an elastic plate 323 and a magnetic piece 325 as an added mass attached to the center portion of this elastic plate 323. The lower portion of the base 309 in FIG. 14 is treated with epoxy potting 327.

In the thus constituted electromagnetic type electroacoustic transducer, the elastic plate 323 integrally provided with the magnetic piece 325 is attracted by the plastic magnet 321 so that it has a given polarity. When a current flows across the coil 315 via the lead terminals 317 and 319 under this situation, the core 311 is magnetized, generating a magnetic field at the distal end. When the magnetic pole of the core 311 induced by the coil 315 differs from the magnetic pole induced by the plastic magnet 321 attached to the elastic plate 323, the elastic plate 323 is attracted to the core 311. When the former magnetic pole of the core 311 is the same as the latter magnetic pole induced by the plastic magnet 321, the elastic plate 323 repels the core 311. By allowing the current to intermittently flow in either direction, therefore, the elastic plate 323 repeats the above-described operation. In other words, the elastic plate 323 vibrates at a given frequency, thus generating a sound.

A further electromagnetic type electroacoustic transducer is illustrated in FIGS. 15 and 16. A case 401 comprises an upper case 101*a* and a lower case 401*b*. A sound port 403 is formed in the center of the upper end of the upper case 401*a* in FIG. 16. The lower case 401*b* has an opening 407 at the lower end in FIG. 16. A base 409 is attached to the opening 407, and a core 411 is secured to the center of the base 409 with a coil (magnet wire) 415 wound around the core 411. Coil terminals 415*a* and 415*b* of the coil 415 at both ends are arranged on copper foils 413*a* and 413*b* of a printed circuit board 413. The coil terminals 415*a* and 415*b* are soldered to the copper foils 413*a* and 413*b* and are electrically connected to lead terminals 417 and 419 caulked and soldered onto the copper foils 413*a* and 413*b*.

A magnet 421 is arranged around the coil 415. A diaphragm 422 is provided at the step portion of the lower case 401*b* at the upper portion in FIG. 16. This diaphragm comprises an elastic plate 423 and a magnetic piece 425 as an added mass attached to the center portion of the elastic plate 423.

In the thus constituted electromagnetic type electroacoustic transducer, the elastic plate 423 integrally provided with the magnetic piece 425 is attracted by the magnet 421 so that it has a given polarity. When a current flows across the coil 415 via the lead terminals 417 and 419 under this situation, the core 411 is magnetized, generating a magnetic field at the distal end. When the magnetic pole of the core 411 induced by the coil 415 differs from the magnetic pole induced by the magnet 421 attached to the elastic plate 423, the elastic plate 423 is attracted to the core 411. When the former magnetic pole of the core 411 is the same as the latter magnetic pole induced by the magnet 421, the elastic plate 423 repels the core 411. By allowing the current to intermittently flow in either direction, therefore, the elastic plate 423 repeats the above-described operation. In other words, the elastic plate 423 vibrates at a given frequency, thus generating a sound.

The coil terminals 211, 315 and 415 used in the above-discussed electromagnetic type electroacoustic transducers are each formed of a copper core wire covered with an insulating coat. The electromagnetic type electroacoustic transducer illustrated in FIGS. 12 and 13 and the electromagnetic type electroacoustic transducer illustrated in FIGS.

15 and 16 are of a so-called "bobbinless type." A coil wire material as shown in FIG. 18 is used in such a bobbinless type electromagnetic type electroacoustic transducer. In this case, a copper core wire 511 is covered with an insulator 513 of polyurethane or polyester, and this insulator 513 is further covered with another fusion member 515 of metamorphic nylon or the like. The electromagnetic type electroacoustic transducer illustrated in FIG. 14 is of a so-called "bobbin type" in which a coil wire material as shown in FIG. 17 is used. In this case, a copper core wire 611 is covered with an insulator 613 of polyurethane or polyester.

The lead terminals 223 and 225, the lead terminals 317 and 319, the lead terminals 417 and 419 and their peripheral portions are structured as follows. First, the lead terminals 223 and 225 and the peripheral portions thereof are constituted by inserting and attaching terminal members made of a copper alloy plate to a board of a thermoplastic resin. The lead terminals 317 and 319 and the peripheral portions thereof are constituted by attaching terminal members made of a copper alloy rod to a bobbin of a thermoplastic resin. The lead terminals 317 and 319 and the peripheral portions thereof are constituted by attaching terminal members to the copper foils 413*a* and 413*b* adhered to the board 413 of a thermosetting resin.

The above-described conventional structures have the following shortcomings.

In the case of the electromagnetic type electroacoustic transducer shown in FIGS. 12 and 13, the coil terminals 211*a* and 211*b* are securely soldered to the lands 223*a* and 225*a* of the lead terminals 223 and 225. With regard to the electromagnetic type electroacoustic transducer shown in FIG. 14, the coil terminals 315*a* and 315*b* are securely soldered to the bobbin 313 while they are bound to the lead terminals 317 and 319. In the case of the electromagnetic type electroacoustic transducer shown in FIGS. 15 and 16, the coil terminals 415*a* and 415*b* are securely soldered to the copper foils 413*a* and 413*b* on the printed circuit board 413.

At the time of connection, the insulating coats and the fusion coats of the coil terminals 211*a*, 211*b*, 315*a*, 315*b*, 415*a* and 415*b* should be melted to expose the copper core wires. It is therefore necessary to set the temperature at the soldering time to the temperature at which the insulating coats and the fusion coats can be melted and removed. With regard to the temperature at the soldering time, it is necessary to also consider the soldering temperature of about 200° C. in a reflow furnace at the later time of mounting the electromagnetic type electroacoustic transducer on a circuit board of another device. In consideration of this temperature, a high-temperature solder whose melting temperature is about 250° C. is used. That is, the soldering of the coil terminals 211*a* and 211*b*, 315*a* and 315*b*, or 415*a* and 415*b* is executed at the set temperature of 250° C. or higher to melt the insulating coats and the fusion coats of those coil terminals to thereby expose the copper core wires and to solder the core wires to the lead terminals 223 and 225, the lead terminals 317 and 319 or the copper foils 413*a* and 413*b*.

In the light of the workability of soldering, the soldering is normally carried out at the set temperature of about 400° C.

As has already been explained, the peripheral portions of the lead terminals 223 and 225 and the lead terminals 317 and 319 are constituted by a thermoplastic resin board, and the peripheral portions of the lead terminals 417 and 419 are constituted by a thermosetting resin board to which copper foils are adhered. A thermoplastic resin and an adhesive for adhering copper foils to a thermosetting resin board have a low temperature resistivity. When soldering is performed at the aforementioned high temperature of about 400° C., therefore, the thermoplastic resin board which constitutes the peripheral portions of the lead terminals 223 and 225 and the lead terminals 317 and 319 may be thermally damaged, and the copper foils which constitute the peripheral portions of the lead terminals 417 and 419 may be separated from the thermosetting resin board due to the reduced adhesiveness between the copper foils and this board. In this respect, the soldering should be completed within a short period of time, thus requiring a skillful work.

Further, the high-temperature soldering using a high-temperature solder may melt even the core wires of the coil terminals 211*a*, 211*b*, 315*a*, 315*b*, 415*a* and 415*b*, causing a so-called "burning-out phenomenon" or the oxidization of the core wires due to the activator of the solder flux. This also requires a skillful work.

Moreover, the quality of the soldered portions formed by the soldering work that needs skills inevitably varies.

SUMMARY OF THE INVENTION

Accordingly, it is an objective of the present invention to provide a terminal connection method of a coil and a terminal connection structure of a coil, which can facilitate the connection of coil terminals to lead terminals and can improve the reliability of the connected portions.

To achieve the above objective, a terminal connection method of a coil according to this invention comprises the steps of arranging coil terminals of a coil on lead terminals; removing insulating coats of the coil terminals to expose core wires; and applying an electric conductivity adhesive to connected portions of the coil terminals and the lead terminals.

The peripheral portions of the lead terminals may be basically constituted by a thermally susceptible material.

The insulating coats may be removed by irradiating a laser beam to the coil terminals.

A hardening treatment may be performed after applying the electric conductivity adhesive.

The coil may be a coil for use in an electromagnetic type electroacoustic transducer.

A terminal connection structure of a coil according to this invention comprises coil terminals arranged on lead terminals, with insulating coats removed from the coil terminals; and an electric conductivity adhesive applied to connected portions of the coil terminals and the lead terminals.

The peripheral portions of the lead terminals may be basically constituted by a thermally susceptible material.

The coil may be a coil for use in an electromagnetic type electroacoustic transducer.

The terminal connection method of a coil according to this invention connects the coil terminals to the respective lead terminals by using an electric conductivity adhesive, not by high-temperature soldering which has been performed conventionally. First, insulating coats of the coil terminals are removed to expose core wires. Then, an electric conductivity adhesive is applied to the connected portions of the coil terminals and the lead terminals to connect both terminals.

When the peripheral portions of the lead terminals are basically constituted by a thermally susceptible material, the desired connection can be accomplished without thermally damaging the peripheral portions that are thermally susceptible. Such thermally susceptible materials include a thermoplastic resin and various kinds of adhesives (an adhesive for adhering copper foils onto the printed circuit board), for example.

Various methods may be employed to remove the insulating coats. One way to accomplish it to irradiate a laser beam to the coil terminals.

Depending on the type of the electric conductivity adhesive in use, a hardening treatment may be performed after applying the electric conductivity adhesive. In this case, the portion where the electric conductivity adhesive is applied can be hardened promptly so that the next step can be taken quickly.

The terminal connection method of a coil according to this invention does not particularly limit the usage of a coil, but can effectively adapted to the connection of the coil terminals of a coil which is used in an electromagnetic type electroacoustic transducer, for example.

A terminal connection structure of a coil according to this invention is what is acquired by the above-described terminal connection method of a coil.

Because the coil terminals are connected to the respective lead terminals by using an electric conductivity adhesive, not by high-temperature soldering which has been performed conventionally, the base member of the peripheral portions of the lead terminals is not thermally damaged, and the reliability of the peripheral portions of the lead terminals and thus the reliability of the connected portions can be maintained. Since the connection does not require a skillful work as is need in the conventional high-temperature soldering, the connection of the coil terminals to the lead terminals becomes easier. In addition, unlike the conventional high-temperature soldering, this connection method does not cause a variation in the quality of the connected portions, so that the reliability of the connected portions can be improved significantly. Further, the connected portions are not degraded even by soldering in a reflow furnace which is executed when a completed electromagnetic type electroacoustic transducer is mounted on a circuit board of another device. It is therefore possible to keep the reliability of the connected portions and thus the reliability of the electromagnetic type electroacoustic transducer.

The present structure is particularly advantageous when the peripheral portions of the lead terminals is made of a thermally susceptible material.

In the case where the insulating coats of the coil terminals are removed by irradiating a laser beam to the coil terminals, the desired portions can be locally removed, thus preventing other devices from being influenced by the removable.

DETAILED DESCRIPTION OF THE PREFERRED EMBODIMENTS

First Embodiment

Figure 1:
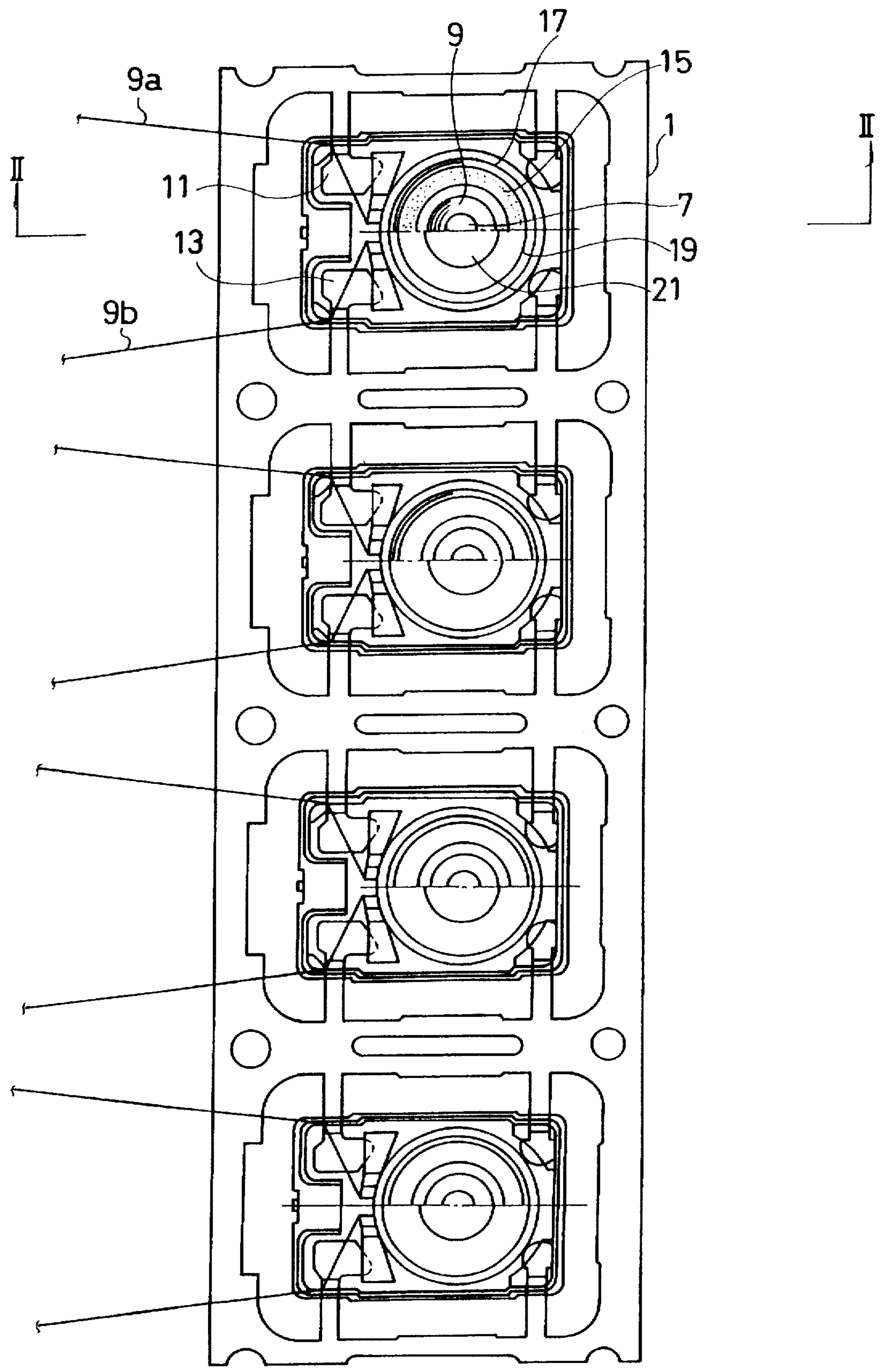
FIG. 1 is a diagram of the first embodiment of this invention, illustrating a plurality of electromagnetic type electroacoustic transducers connected side by side by a terminal.
Figure 2:
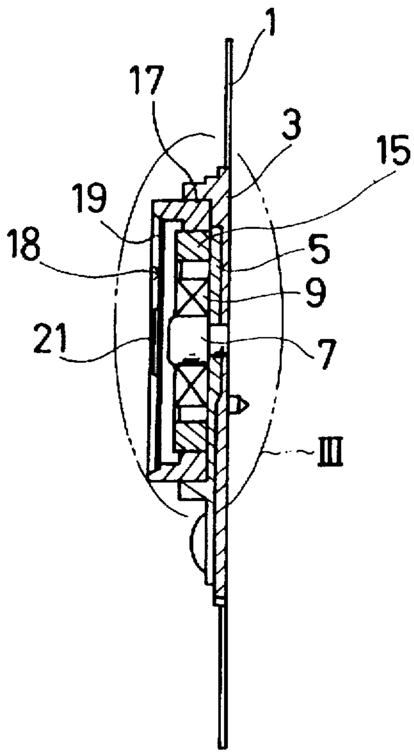
FIG. 2 is a cross-sectional view of the first embodiment of this invention taken along the line II—II in FIG. 1.
Figure 3:
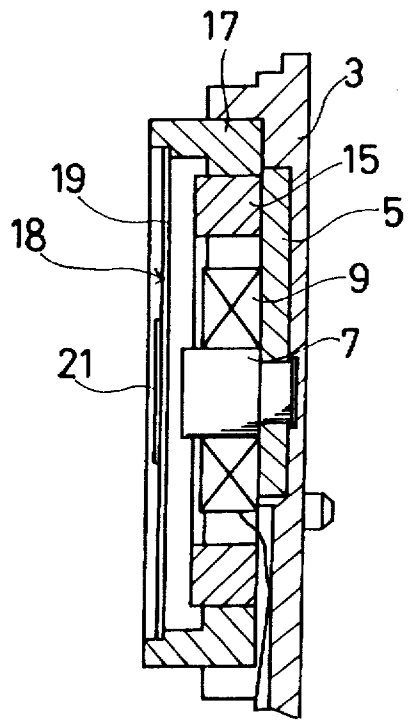
FIG. 3 is a cross-sectional view showing in enlargement a portion III in FIG. 2 in the first embodiment of this invention.

The first embodiment of the present invention will now be described with reference to FIGS. 1 through 7. According to the first embodiment, this invention is adapted to manufacturing an electromagnetic type electroacoustic transducer. To begin with, the structure of the electromagnetic type electroacoustic transducer will be discussed referring to FIGS. 1 through 3. FIG. 1 illustrates a plurality of (four in the diagram) electromagnetic type electroacoustic transducers connected side by side by a lead frame 1. Those electromagnetic type electroacoustic transducers later become separate from one another by cutting the frame 1 at the proper portions.

Figure 18:
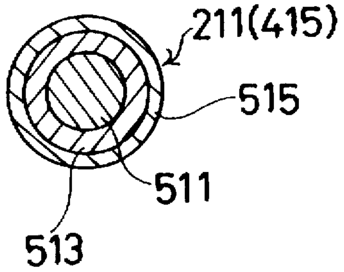
FIG.18 (PRIOR ART)
FIG. 18 is a cross-sectional view of a coil used for explaining the first and third prior arts.

The structure of each electromagnetic type electroacoustic transducer will be discussed below. A base 5 is attached to the inner side of a base member 3. A core 7 is secured to the base 5 with a coil (magnet wire) 9 wound around the core 7. Coil terminals 9*a* and 9*b* at both ends of the coil 9 are so arranged as to extend over lead terminals 11 and 13 as shown in FIG. 1. An electric conductivity adhesive which will be discussed later is applied to the crossing portions to connect the coil terminals 9*a* and 9*b* to the lead terminals 11 and 13 respectively. The coil 9 in use has a structure as shown in FIG. 18 which has been used to describe the prior arts.

The lead terminals 11 and 13 are provided integral with the aforementioned frame 1.

A magnet 15 is placed around the coil 9 with a support ring 17 provided at the outer surface of the magnet 15. A diaphragm 18 is provided at the step portion of the support ring 17. This diaphragm 18 comprises an elastic plate (also called a resonance plate) 19 and a magnetic piece 21 attached as an added mass to the center portion of this elastic plate 19.

In the thus constituted electromagnetic type electroacoustic transducer, the elastic plate 19 integrally provided with the magnetic piece 21 is attracted by the magnet 15 so that it has a given polarity. When a current flows across the coil 9 via the lead terminals 11 and 13 under this situation, the core 7 is magnetized, generating a magnetic field at the distal end. When the magnetic pole of the core 7 induced by the coil 9 differs from the magnetic pole induced by the magnet 15 attached to the elastic plate 19, the elastic plate 19 is attracted to the core 7. When the former magnetic pole of the core 7 is the same as the latter magnetic pole induced by the magnet 15, the elastic plate 19 repels the core 7. By allowing the current to intermittently flow in either direction, therefore, the elastic plate 19 repeats the above-described operation. In other words, the elastic plate 19 vibrates at a given frequency, thus generating a sound.

The following describes how to connect the coil terminals 9*a* and 9*b* to the respective lead terminals 11 and 13 with reference to FIGS. 4 through 7.

Figure 4:
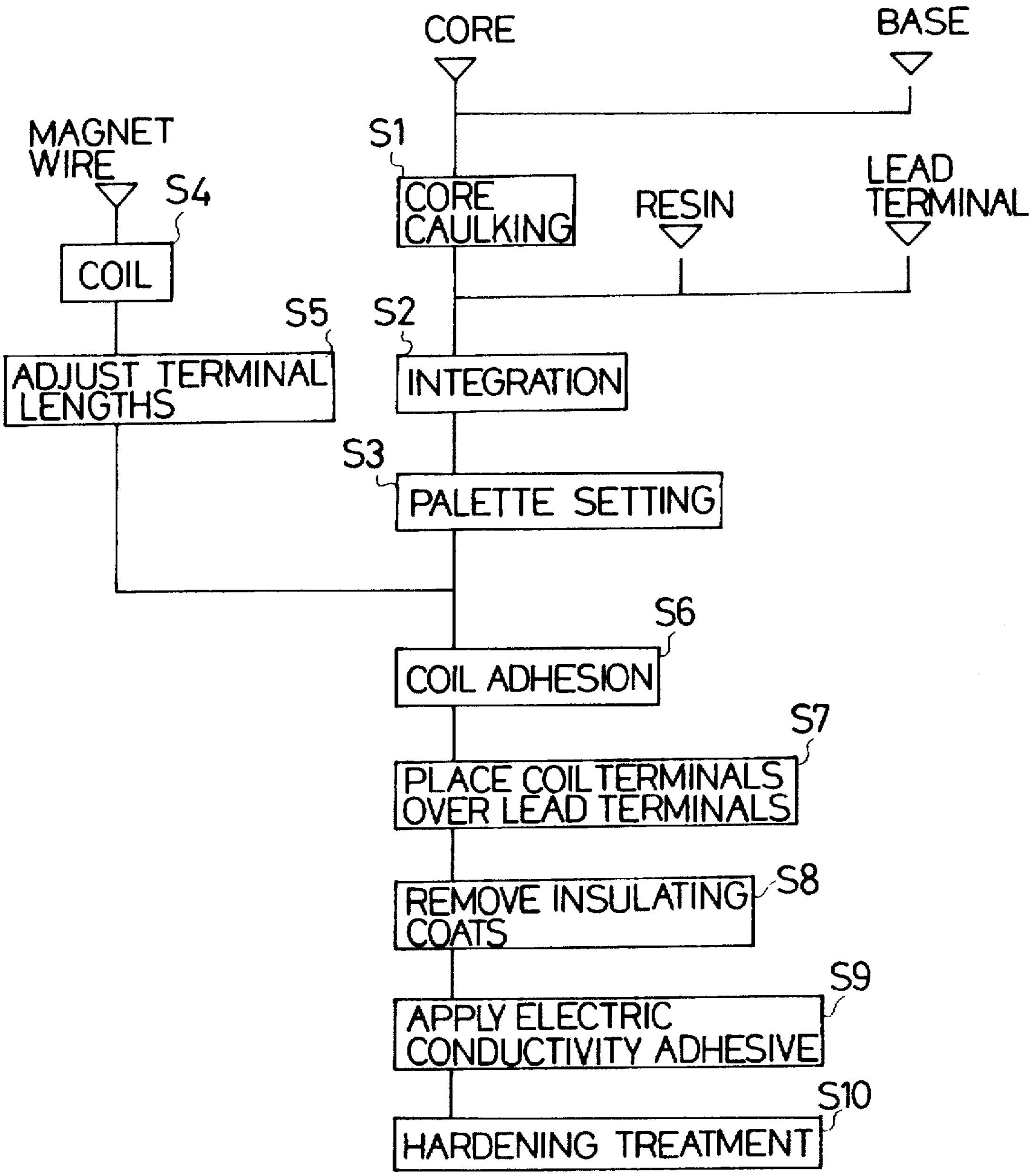
FIG. 4 is a flowchart illustrating steps of connecting coil terminals to lead terminals according to the first embodiment of this invention.
Figure 5:
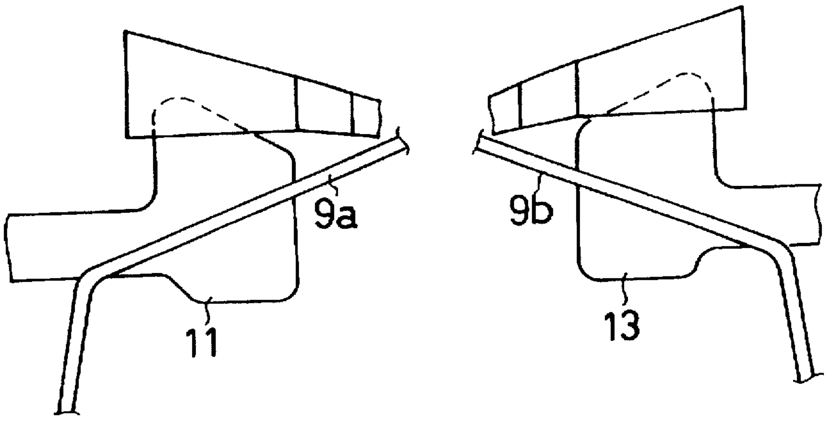
FIG. 5 is a diagram showing a step of connecting the coil terminals to the lead terminals according to the first embodiment of this invention.
Figure 6:
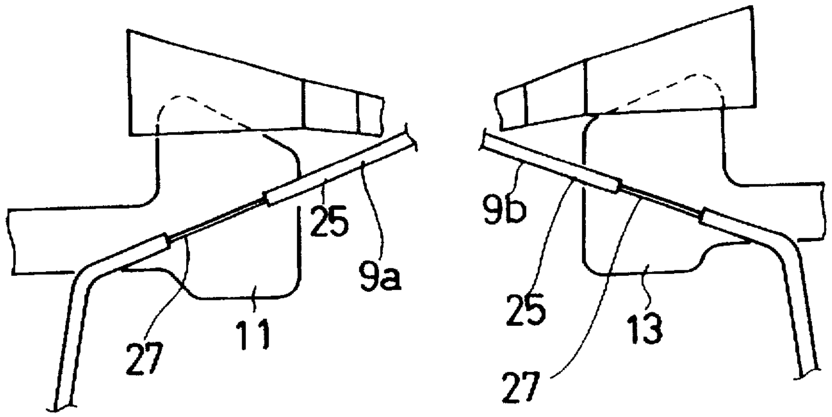
FIG. 6 is a diagram showing a step of connecting the coil terminals to the lead terminals according to the first embodiment of this invention.
Figure 7:
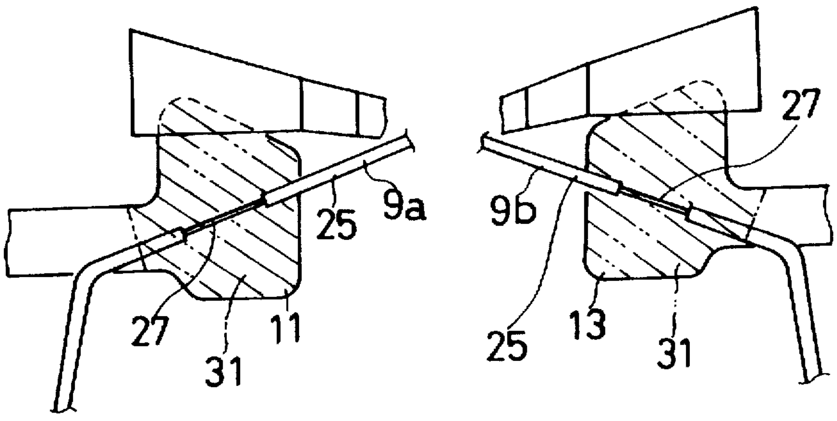
FIG. 7 is a diagram showing a step of connecting the coil terminals to the lead terminals according to the first embodiment of this invention.

FIG. 4 presents a flowchart illustrating procedures of connecting the coil terminals 9*a* and 9*b* to the respective lead terminals 11 and 13, and FIGS. 5 to 7 present diagrams showing in enlargement of the portion associated with the coil terminals 9*a* and 9*b* and the lead terminals 11 and 13.

First, the core 7 is caulked to the base 5 (step S1). Then, the base unit and the lead terminals are formed integrally of a resin, thereby constituting base member 3 (step S2). The flow then proceeds to step S3 to set a palette. The magnet wire (coil 9) is designed in a coil form (step S4) and the lengths of the coil terminals 9*a* and 9*b* are adjusted (step S5). The flow then moves to step S6 to adhere the coil 9.

Next, the coil terminals 9*a* and 9*b* are placed over the lead terminals 11 and 13 (step S7) as shown in FIG. 5, under which situation a laser beam is irradiated to remove insulating coats 25 of the coil terminals 9*a* and 9*b* to expose core wires 27 (step S8) as shown in FIG. 6. Then, an electric conductivity adhesive 31 is applied around the exposed portions of the core wires 27 (step S9), as shown in FIG. 7. This electric conductivity adhesive 31 may be obtained by mixing a thermosetting resin binder like epoxy into particles of conductive metal, such as silver, gold or copper. One example of such an adhesive is DODENT (product name) by Nihon Handa Co. Ltd. The DODENT as the electric conductivity adhesive 31 is a paste-like liquid which essentially consists of silver with an epoxy resin as the binder. A hardening treatment is performed on the portion where the electric conductivity adhesive 31 is applied to quickly harden the adhesive-applied portion (step S10). After the hardening treatment, the resultant structure is placed at room temperature to become solid. This completes the connection of the coil terminals 9*a* and 9*b* to the respective lead terminals 11 and 13.

This embodiment has the following advantages.

Since the connection is made by the electric conductivity adhesive 31, not high-temperature soldering as in the prior arts, the base member of the peripheral portions of the lead terminals 11 and 13 is not thermally damaged and the reliability of the peripheral portions of the lead terminals 11 and 13 and thus the reliability of the connected portions can be maintained.

A possible base member for the peripheral portions of the lead terminals 11 and 13 may be made of a thermally susceptible material such as a thermoplastic resin or various kinds of adhesives. With a thermoplastic resin in use, it is possible to suppress the heat-oriented plastic progression. When an adhesive (an adhesive to be applied onto a printed circuit board) is used, the reduction of the adhesive strength can be prevented effectively.

As this embodiment does not require the skillful work which is needed in the conventional connection by high-temperature soldering, the work of connecting the coil terminals 9*a* and 9*b* to the respective lead terminals 11 and 13 becomes easier.

In addition, unlike the conventional high-temperature soldering, this connection method does not cause a variation in the quality of the connected portions, so that the reliability of the connected portions can be improved significantly.

According to this embodiment, the insulating coats of the coil terminals 9*a* and 9*b* are removed prior to the application of the electric conductivity adhesive 31 by the irradiation of a laser beam. As this irradiation of a laser beam can be performed very locally to be targeted to only the desired portion, this work has less influence on the ambient environment, is simple and very reliable.

Furthermore, the connected portions are not degraded even by soldering in a reflow furnace which is executed when a completed electromagnetic type electroacoustic transducer is mounted on a circuit board of another device. It is therefore possible to keep the reliability of the connected portions and thus the reliability of the electromagnetic type electroacoustic transducer.

Second Embodiment

Figure 8:
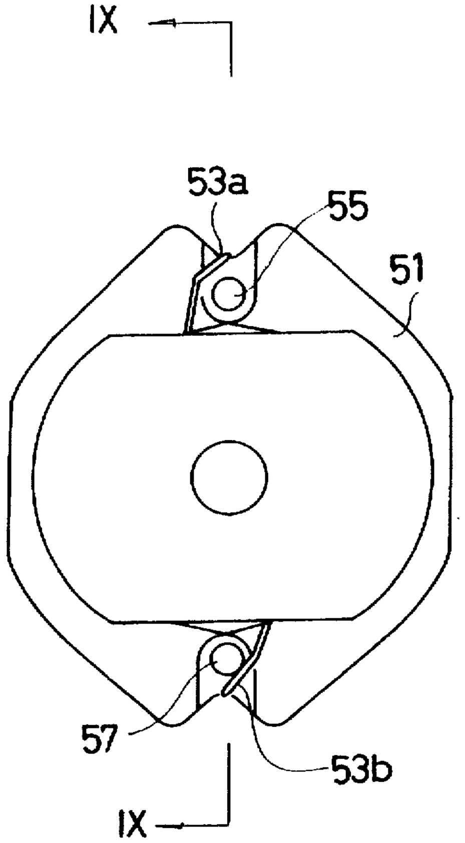
FIG. 8 is a top view showing the structure of a part of a different type of electromagnetic type electroacoustic transducer according to the second embodiment of this invention.
Figure 9:
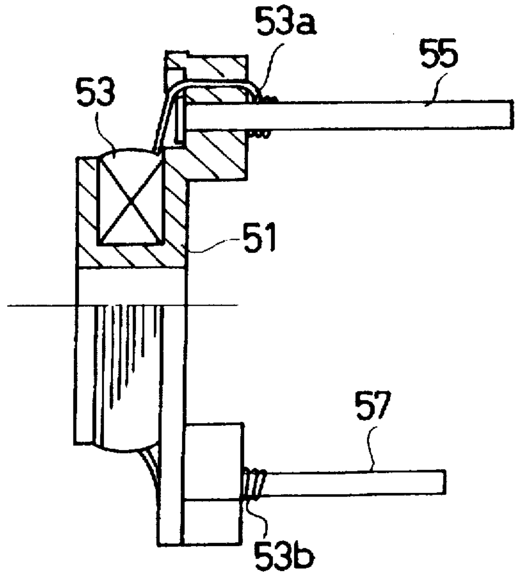
FIG. 9 is a cross-sectional view of the second embodiment of this invention taken along the line IX—IX in FIG. 8.

With reference to FIGS. 8 and 9, a description will now be given of the second embodiment of this invention which is adapted to the assembling of a different type of an electromagnetic type electroacoustic transducer. FIGS. 8 and 9 show the structure of a part of this electromagnetic type electroacoustic transducer. A coil 53 is wound around a bobbin 51. Coil terminals 53*a* and 53*b* at both ends of the coil 53 are bound to rod-like lead terminals 55 and 57 which are attached to the bobbin 51.

Figure 17:
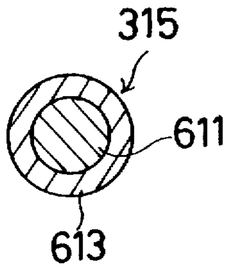
FIG.17 (PRIOR ART)
FIG. 17 is a cross-sectional view of a coil used for explaining the second prior art.

The coil 53 in this embodiment has a structure as shown in FIG. 17 which has been used to explain one of the prior arts.

Under this situation, a laser beam is irradiated onto the coil terminals 53*a* and 53*b* to remove their insulating coats, thereby partially exposing the core wires, as per the first embodiment. Then, an electric conductivity adhesive is applied to where necessary and then a hardening treatment is performed. The second embodiment can therefore have the same advantages as the first embodiment.

Third Embodiment

Figure 10:
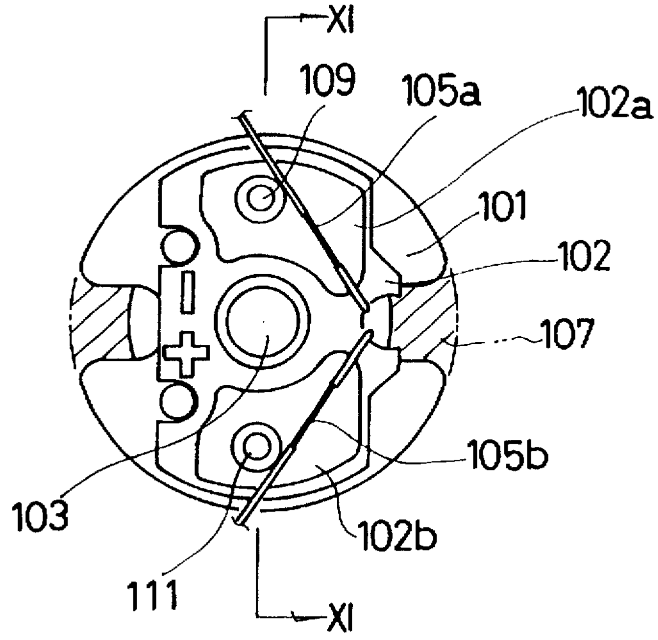
FIG. 10 is a top view showing the structure of a part of another electromagnetic type electroacoustic transducer according to the third embodiment of this invention.
Figure 11:
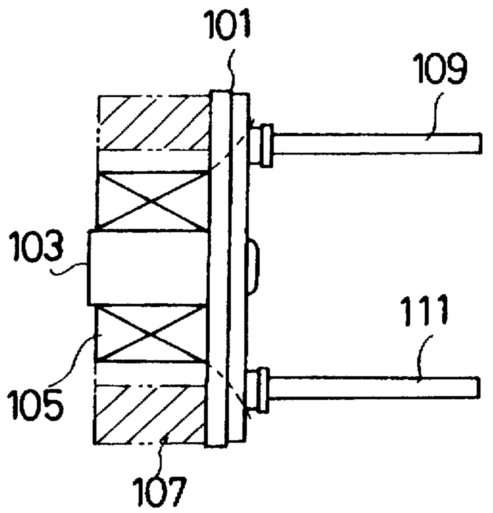
FIG. 11 is a cross-sectional view of the third embodiment of this invention taken along the line XI—XI in FIG. 10.
Figure 12:
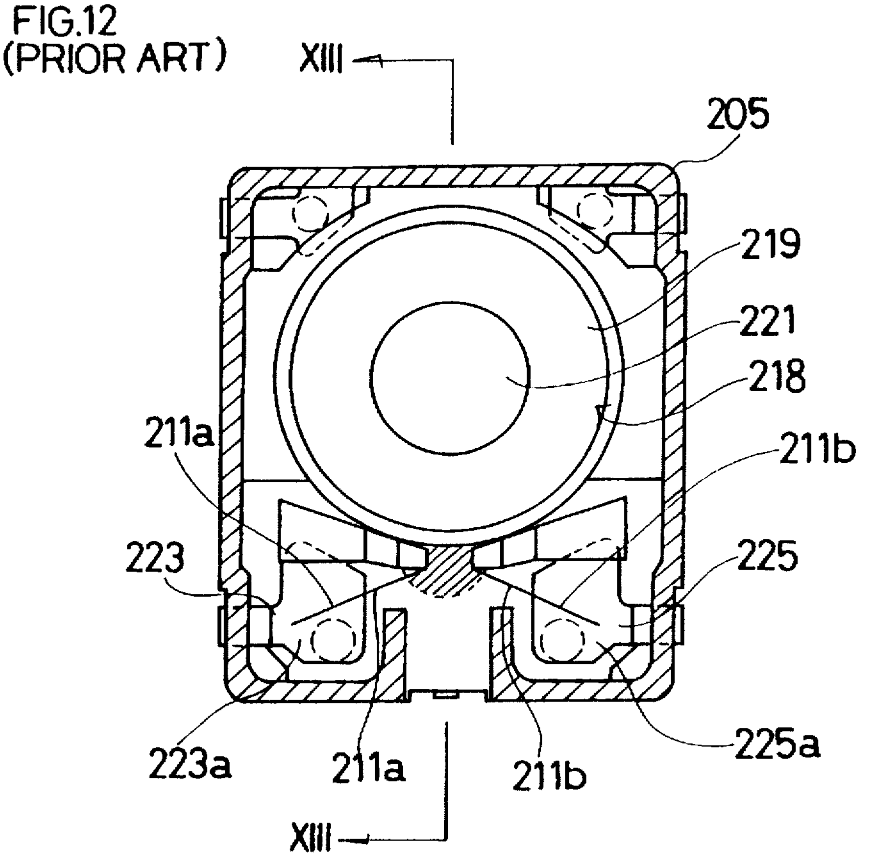
FIG.12 (PRIOR ART)
FIG. 12 is a top view of an electromagnetic type electroacoustic transducer according to one prior art.
Figure 13:
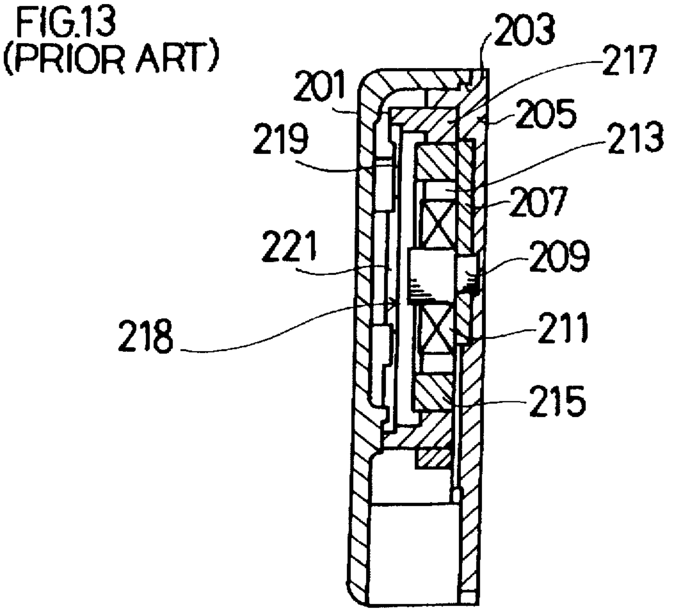
FIG.13 (PRIOR ART)
FIG. 13 is a cross-sectional view of this prior art taken along the line XIII—XIII in FIG. 12.
Figure 14:
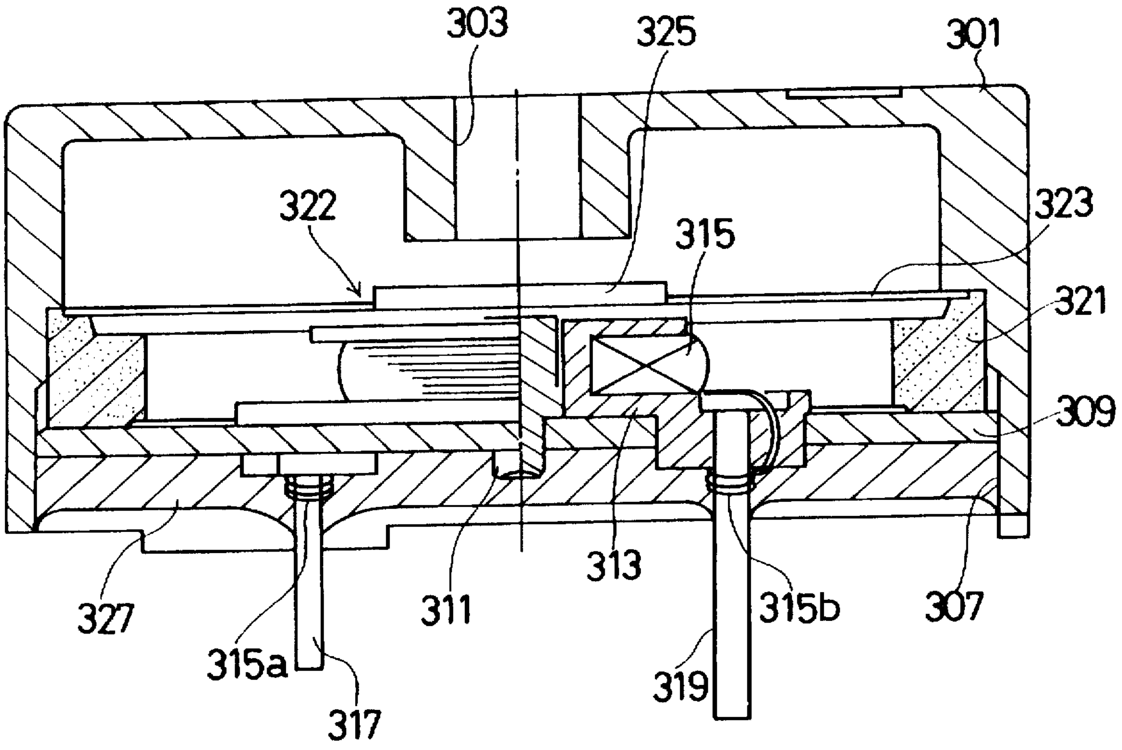
FIG.14 (PRIOR ART)
FIG. 14 is a cross-sectional view of an electromagnetic type electroacoustic transducer according to another prior art.
Figure 15:
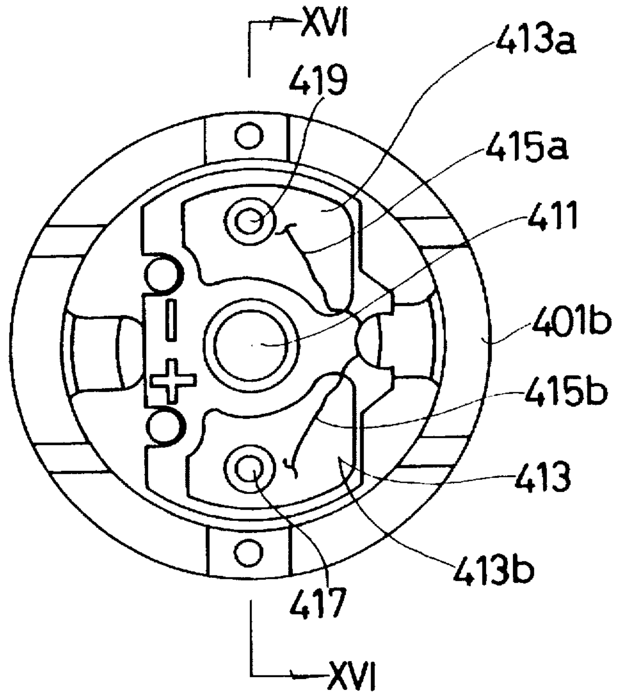
FIG.15 (PRIOR ART)
FIG. 15 is a top view of an electromagnetic type electroacoustic transducer according to a further prior art.
Figure 16:
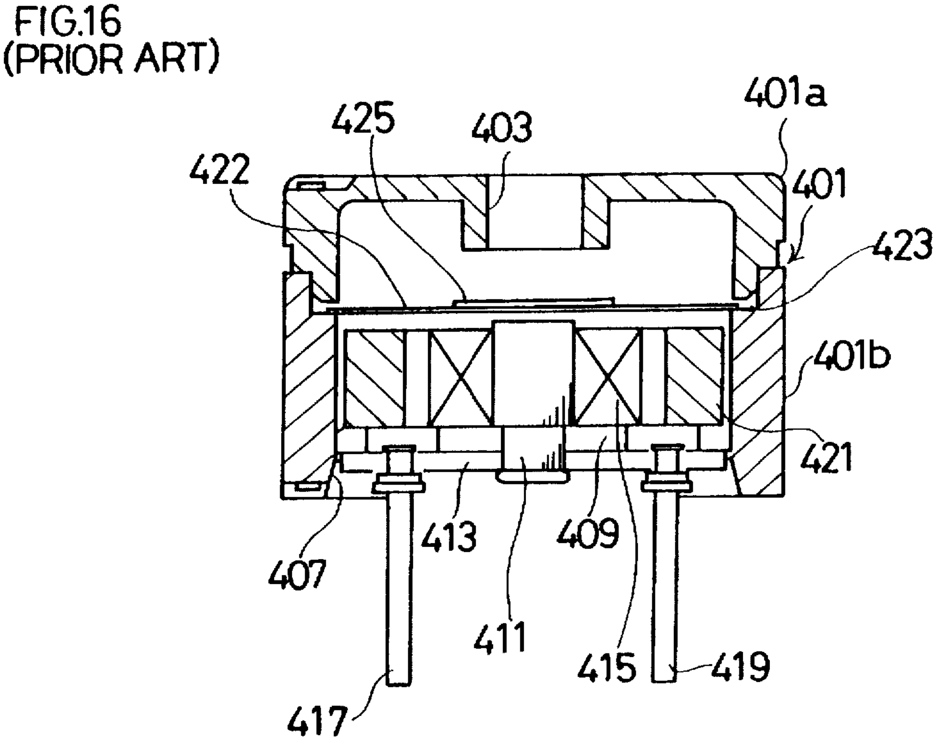
FIG.16 (PRIOR ART)
FIG. 16 is a cross-sectional view of this prior art taken along the line XVI—XVI in FIG. 15.

Referring to FIGS. 10 and 11, a description will now be given of the third embodiment of this invention which is adapted to the assembling of another type of an electromagnetic type electroacoustic transducer. FIGS. 10 and 11 show the structure of a part of this electromagnetic type electroacoustic transducer. A core 103 is attached to a base 101. A coil 105 is wound around the core 103 and its coil terminals 105*a* and 105*b* are placed over copper foils 102*a* and 102*b* which are respectively connected to lead terminals 109 and 111 on a printed circuit board 102 attached to the base 101. A magnet 107 is arranged around the coil with a clearance therebetween.

The coil 105 in this embodiment has a structure as shown in FIG. 18 which has been used to explain one of the prior arts.

Under this situation, a laser beam is irradiated onto the coil terminals 105*a* and 105*b* to remove their insulating coats, thereby partially exposing the core wires, as per the first and second embodiments. Then, an electric conductivity adhesive is applied to where necessary and then a hardening treatment is performed. The third embodiment can therefore have the same advantages as the first and second embodiments.

The aforementioned electric conductivity adhesive is just illustrative, and various other kinds of electric conductivity adhesives may be used as well. For example, there is an electric conductivity adhesive which requires no hardening treatment after application, so that when such an adhesive is used, the hardening treatment after application becomes unnecessary.

The removal of the insulating coats may be accomplished by various other schemes than the laser beam irradiation, such as hot light irradiation, mechanical means using a cutter, a file or the like, and removal by a solvent which varies according to the material for the coil.

What is claimed is:

1. A terminal connection method of a coil comprising the steps of:

arranging coil terminals of a coil on lead terminals;

removing insulating coats of said coil terminals to expose core wires; and applying an electric conductivity adhesive to connected portions of said coil terminals and said lead terminals;

wherein peripheral portions of said lead terminals are constituted by a thermally susceptible material.

2. The terminal connection method as claimed in claim 1, wherein said insulating coats are removed by irradiating a laser beam to said coil terminals.

3. The terminal connection method as claimed in claim 1, wherein a hardening treatment is performed after applying said electric conductivity adhesive.

4. The terminal connection method as claimed in claim 1, wherein said coil is a coil for use in an electromagnetic type electroacoustic transducer.

5. A terminal connection structure of a coil comprising:

coil terminals arranged on lead terminals, with insulating coats removed from said coil terminals; and p1 an electric conductivity adhesive applied to connected portions of said coil terminals and said lead terminals;

wherein peripheral portions of said lead terminals are constituted by a thermally susceptible material.

6. The terminal connection structure as claimed in claim 5, wherein said coil is a coil for use in an electromagnetic type electroacoustic transducer.

* * * * *